L. Stevens.

Manufacture of Gas.

No. 3,338. Reissued Mar. 23, 1869.

Witnesses:
Chas. C. Wilson
Edmund Masson

Inventor:
Levi Stevens
By Atty
A. B. Stoughton

UNITED STATES PATENT OFFICE.

LEVI STEVENS, OF WASHINGTON, DISTRICT OF COLUMBIA.

IMPROVEMENT IN THE MANUFACTURE OF ILLUMINATING-GAS.

Specification forming part of Letters Patent No. 87,123, dated February 23, 1869; Reissue No. 3,338, dated March 23, 1869.

*To all whom it may concern:*

Be it known that I, LEVI STEVENS, of Washington city, in the District of Columbia, have invented certain new and useful Improvements in Apparatus for Distilling Coal and Mixing and Retorting Vapors in the Manufacture of Illuminating-Gas; and I do hereby declare the following to be a full, clear, and exact description of the same, reference being had to the accompanying drawings, making a part of this specification, in which—

Figure 1:
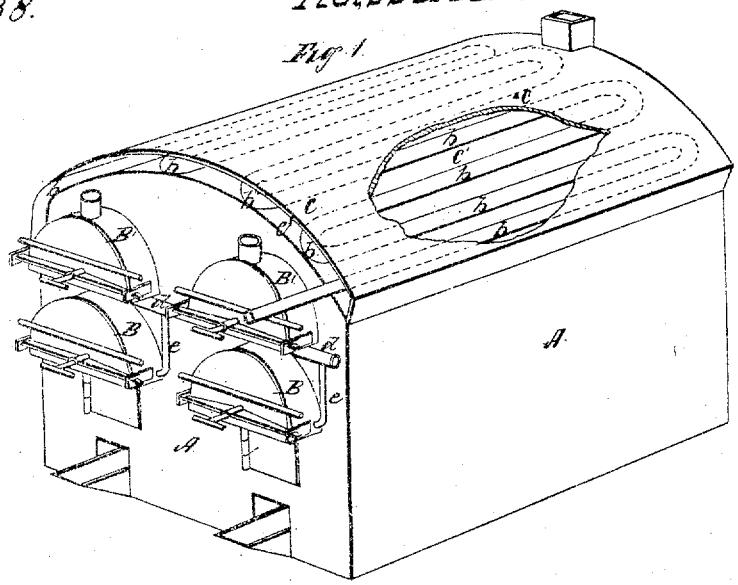
Figure 2:
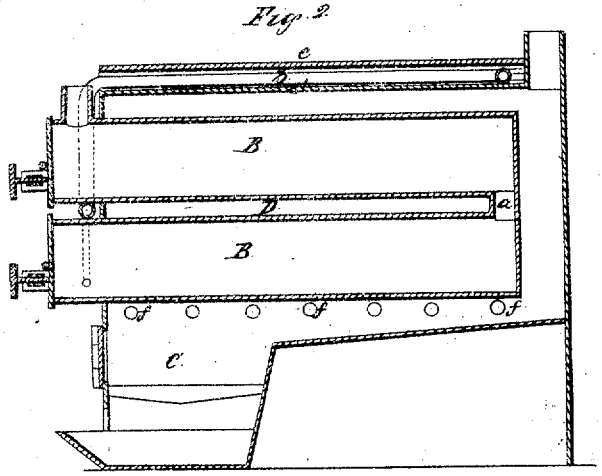

Figure 1 represents, in perspective, so much of the apparatus as will illustrate my invention, and Fig. 2 represents a vertical longitudinal section through the same.

Similar letters of reference, where they occur in the separate figures, denote like parts in both of the drawings.

In the manufacture of illuminating-gas from coal, as now practiced, the first of the process is expended in the distillation of coal-tar, which is not only useless, but is a great waste of gas-making material. Besides, this coal-tar clogs up the retorts. So, too, in recharging a retort, the chill produced by the charging in of the cold material results in the production of coal-tar and not in gas, and this production of this worse than useless material will continue until the degree of heat required to eliminate gas is again restored to the retort or chamber containing the gas-making material.

It is impracticable to stop the production of coal-tar at the outset of the process, or when the retorts become chilled by charging in the cold material, if the generating of the vapors and the retorting be attempted in one and the same retort or chamber.

My invention consists, first, in separate vaporizing-chambers for distilling coal and mixing the vapors from coal with hydro-oxygen or other vapor for retorting.

My invention further consists in the combination of a vaporizing-chamber with a retort, and a passage uniting said chamber and retort.

My invention finally consists in the combination of a vaporizing-chamber with a retort and a steam-generator or superheater.

To enable others skilled in the art to make and use my invention, I will proceed to describe the same with reference to the drawings.

A represents a bench, in which two retorts, B and B′, are arranged. A single set may be so arranged, or any other number of sets more than two.

Underneath the chamber B, in which the gas-making material is charged, is placed the fire chamber or box C, with suitable grate-bars, fire and smoke flues, ash-box, and fuel-feeding and draft openings; and above the chamber B, with fire-space D intervening, is placed the upper or gas making or converting retort B′. A passage, *a*, unites the chambers of the lower and upper retorts.

Steam from any suitable generator is passed through a coil or series of pipes, *b*, arranged, for convenience and economy, between the arches *c c′* of the bench, where it is dried or superheated, and from thence is taken through the pipes *d e* into the distilling-chamber B, and passed over and mixed with the vapor arising from the distillation of the coal therein, and these mixed vapors pass through the communicating-passage *a* into the retort B, where they are retorted and converted into fixed gas.

The openings *f* through the walls of the fire-chamber are for allowing the heat and flame to surround the retorts.

In this process the hydro-oxygen oxidizes the carbon and leaves free hydrogen, and prevents the carbon from depositing in the retorts or the formation of coal-tar, which is a clear loss of material, and moreover fills or clogs the retorts.

The vaporizing-chamber is separated from the retort by supports that leave fire space or passages between them, and when the chamber is charged with fresh coal the retort is not chilled, but continues its high temperature, and converts the first vapors from the coal into fixed gas.

The great advantage of this process of distilling coal in a suitable chamber—mixing the vapors of the coal with hydro-oxygen vapors, and then passing the combined vapors through a retort of sufficiently high heat to fix them into permanent gas—is in the immense saving of gas-making material and the largely-increased product of gas from a given quantity of coal.

Having thus fully described my invention, what I claim therein as new, and desire to secure by Letters Patent, is—

1. A separate vaporizing-chamber for distilling coal and mixing the vapors from coal with hydro-oxygen or steam for retorting.

2. The combination of the vaporizing and mixing chamber with a retort and the passage *a*, uniting the chamber with the retort, as and for the purposes substantially as described.

3. The combination of a vaporizing-chamber, B, with the retort B′ and superheater of steam, substantially as and for the purposes described.

LEVI STEVENS.

Witnesses:
A. B. STOUGHTON,
EDMUND MASSON.